United States Patent
Kimura et al.

(10) Patent No.: US 6,521,726 B1
(45) Date of Patent: Feb. 18, 2003

(54) METHOD OF PRODUCING A POLYMER

(75) Inventors: Osamu Kimura, Ichihara (JP); Takamasa Fujii, Ichihara (JP); Satoshi Bandai, Ichihara (JP); Takashi Kitamura, Ichihara (JP); Toshifumi Fukunaga, Ichihara (JP); Masato Murakami, Ichihara (JP)

(73) Assignee: UBE Industries, Ltd. (JP)

( * ) Notice: Subject to any disclaimer, the term of this patent is extended or adjusted under 35 U.S.C. 154(b) by 0 days.

(21) Appl. No.: 10/119,616

(22) Filed: Apr. 10, 2002

(30) Foreign Application Priority Data

| Apr. 12, 2001 | (JP) | ......................... | 2001-114287 |
| Oct. 2, 2001 | (JP) | ......................... | 2001-306397 |
| Jan. 24, 2002 | (JP) | ......................... | 2002-015172 |
| Jan. 24, 2002 | (JP) | ......................... | 2002-015174 |

(51) Int. Cl.$^7$ ............................ C08F 2/38; C08F 36/04
(52) U.S. Cl. ....................... 526/160; 526/138; 526/335; 526/340.4; 526/905
(58) Field of Search ................. 526/138, 160, 526/335, 340.4, 905

(56) References Cited

U.S. PATENT DOCUMENTS

| 3,472,829 A | * | 10/1969 | Claybaugh et al. | ..... 526/905 X |
| 6,071,845 A | | 6/2000 | Tsujimoto et al. | .......... 502/103 |
| 6,300,450 B1 | | 10/2001 | Tsujimoto et al. | .......... 526/355 |

FOREIGN PATENT DOCUMENTS

| JP | 41-5474 | 3/1966 | | |
| JP | 46-20494 | 6/1971 | | |
| JP | 9194526 | 7/1997 | ............. | C08F/4/76 |
| JP | 11236411 | 8/1999 | ........... | C08F/4/642 |

OTHER PUBLICATIONS

G. Ricci et al, "Polymerization of 1,3–Dienes with Catalysts Based on Mono and bid–cyclopentadienyl Derivatives of Vanadium", Polymer, vol. 37, No. 2, 1995, pp. 363–365.

Giovanni Ricci, "Influence of Monomer Structure on Chemo and Stereoselectivity of 1,3–Diene Polymerization", Macromol. Symposium 89, 1995, pp. 383–392.

* cited by examiner

*Primary Examiner*—Fred Teskin
(74) *Attorney, Agent, or Firm*—Schnader Harrison Segal & Lewis LLP

(57) ABSTRACT

A polymer of ethylenically unsaturated monomer, for example, 1,3-butadiene, having a desired molecular weight and distribution thereof is produced, with a high stability, by preparing a solution of hydrogen in an inert organic solvent for the monomer in which a vapor-liquid phase equilibrium of hydrogen is attained, and then by addition-polymerizing the monomer in the hydrogen-dissolved inert organic solvent in the presence of a catalyst preferably including a metallocene complex of transition metal compound, an inert compound of a non-coordination anionic compound with a cationic compound, an organic metal (aluminum) compound and, optionally, water.

18 Claims, 5 Drawing Sheets

METHOD OF PRODUCING A POLYMER

BACKGROUND OF THE INVENTION

(1) Field of the Invention

The present invention relates to a method of producing a polymer from an ethylenically unsaturated organic monomer. More particularly, the present invention relates to a method of producing a polymer by a catalytic addition-polymerization of an ethylenically unsaturated organic compound, for example, an olefin compound, a vinyl compound and a conjugated diene compound, particularly 1,3-butadiene, in which method hydrogen is utilized as a molecular weight-modifier.

(2) Description of the Related Art

It is well-known that conjugated diene compounds, for example, 1,3-butadiene can be polymerized in the presence of catalysts to produce various types of corresponding polymers different in microstructure thereof from each other, in response to the types and compositions of the catalysts used for the polymerization.

In view of micro structure of the polybutadiene, when 1,3-butadiene is polymerized at the 1- and 4-positions of the molecule thereof, a 1,4-structure is formed in the resultant polymeric chain, and when 1,3-butadiene is polymerized at the 1- and 2-positions of the molecule thereof, a 1,2-structure is formed in the resultant polymeric chain.

The polymeric chain of the polybutadiene usually contains both the 1,4-structure and the 1,2-structure. The 1,4-structure includes a cis-1,4-structure and a trans-1,4-structure. The 1,2-structure forms a vinyl side chain in the molecule of the polybutadiene.

As mentioned above, various types of polybutadienes different in the above-mentioned micro structure from each other can be produced in response to the type and composition of the catalyst used. The difference in the micro structure causes a difference in physical and mechanical properties of the resultant polymer. The various types of polybutadiene can be employed in various uses in response to the properties thereof. For example, a certain type of polybutadiene having a high linearity in the molecule thereof exhibits excellent resistance to abrasion and resistance to heat generation and a superior impact resilience.

Further, it is known that a polybutadiene having a high cis-structure content can be produced in the presence of a catalyst comprising a cobalt compound and an organic aluminum compound, and it is expected that a polybutadiene having an appropriate content of a 1,2-structure in combination with the high content of cis-structure is useful as an impact resistance-imparting agent for aromatic vinyl polymers.

Currently, various types of polymerization methods for olefin compounds using a metallocene complex as a catalyst are being briskly developed, and the polymerization of the conjugated diene compound in the presence of the metallocene catalyst is also being studied.

Concerning the polymerization of the conjugated diene compound in the presence of the metallocene complex as a catalyst, Macromol. Symp. 89, 383 (1995) discloses a catalyst system comprising a compound of transition metals of Group IV of the Periodic Table, such as cyclopentadienyl titanium trichloride (Cp $TiCl_3$) and methyl alumoxane. This catalyst is disadvantageous in a low catalytic activity for polymerization for the conjugated diene compounds.

Japanese Examined Patent Publication No. 46-20,494 discloses a method of producing a polybutadiene using a catalyst system comprising $CpVCl_3$, $(i-C_4H_9)_3Al/AlCl_3$ and $H_2O$. This catalyst system is disadvantageous in a low catalystic activity for polymerization of butadiene.

Polymer Vol. 37 (2), p. 363 (1996) reports a method of producing polybutadiene having 10 to 20% by mole of 1,2-structure in combination with a high cis-structure in the presence of a catalyst comprising a vanadium (III) compound, for example, $CpVCl_2(PEt_3)_2$ or $Cp_2VCl$, which is a metallocene complex of a transition metal of Group V of the Periodic Table, and methyl alumoxane.

Japanese Unexamined Patent Publication No. 9-194,526 disclose methods of producing a polybutadiene in the presence of a combination of a vanadium metallocene compound having a specific structure and an ionization agent.

As a method of controlling a molecular weight of polybutadiene during a polymerization procedure of 1,3-butadiene, for example, in a production procedure of a high cis-structure polybutadiene in the presence of a catalyst comprising a cobalt compound or a nickel compound and an organic aluminum compound. Japanese Examined Patent Publication No. 41-5,474 discloses a method using cyclooctadiene as a molecular weight modifier for the polybutadiene. This method is, however, disadvantageous in that when cyclooctadiene is added to a polymerization system containing a catalyst containing a metallocene complex of transition metals of Group V of the Periodic Table, the catalytic activity of the catalyst for polymerization decreases and/or the micro structure of the polymer of the conjugated diene compound changes.

U.S. Pat. No. 6,300,450 discloses that in a polymerization of a conjugated diene compound in the presence of a catalyst comprising a metallocene complex of compounds of transition metals of Group V of the Periodic Table, the molecular weight of the resultant polymer of the conjugated diene compound is controlled by carrying out the polymerization in the presence of hydrogen.

In this method, however, since the hydrogen is directly introduced into the polymerization mixture in a polymerization vessel, when the viscosity of the polymerization mixture (liquid) increases, the distribution of hydrogen in the polymerization mixture in the polymerization vessel may become uneven and the contiol of the molecular weight may be unstably effected. Accordingly, this method should be improved.

As disclosed in U.S. Pat. No. 6,071,845, the inventors of the present invention found that when a polymerization catalyst comprising a metallocene complex of vanadium metal compounds and an ionic compound of non-coordinated anionic compound with cationic compounds and/or aluminoxane is used for polymerization of 1,3-butadiene, the resultant product is a polybutadiene (MBR) having a micro structure in which an appropriate content of 1,2-structure is combined with cis-1,4-structure in a high content and trans-1,4-structure in a low content, and a high molecular linearity. This polybutadiene resin exhibit excellent properties, and thus various attemps have been made for applications of the polybutadiene resin for high impact strength polystyrene resins and tire materials. However, the polybutadiene resin exhibits a relatively high cold flow and thus, sometimes, should be improved in aptitude to storage and transportation.

Japanese Unexamined Patent Publication No. 11-236,411 discloses a polybutadiene resin (MBR) exhibiting a molecular weight distribution having two peaks. This MBR resin comprises a low molecular weight fraction has a weight average molecular weight of 2000 to 300,000 and a high molecular weight fraction having a weight average molecular weight of 500,000 to 5,000,000. In the examples of the Japanese patent publication, two peak type polybutadiene resins each comprising a high molecular weight fraction having a weight average molecular weight similar to that of usual butadiene rubber, for example, 350,000 to 600,000, and a very low molecular weight fraction are disclosed. However, this Japanese patent publication is quite silent as to an improvement of the cold flow property of the two peak type polybutadiene resins.

SUMMARY OF THE INVENTION

An object of the present invention is to provide a method of producing a polymer from at least one ethylenically unsaturated organic monomer, in which method the molecular weight of the target polymer is smoothly controlled by using hydrogen as a molecular weight modifier.

Another object of the present invention is to provide a method of producing a polymer from at least one ethylenically unsaturated organic monomer, in which method the molecular weight of the target polymer is smoothly controlled by using hydrogen as a molecular weight modifier and the target polymer is continuously produced with high conversion of the monomer, efficiency and productivity.

The above-mentioned objects can be attained by the method of the present invention for producing a polymer from at least one ethylenically unsaturated organic monomer, which method comprises
(1) bringing, in a mixing vessel, a hydrogen-containing gas into contact with an inert organic solvent, to prepare a solution of hydrogen in an inert organic solvent, in which solution, a vapor-liquid phase equilibrium between the vapor phase hydrogen in the hydrogen-containing gas and the liquid phase hydrogen in the solution is attained;
(2) addition-polymerizing, in a reactor consisting of at least one reaction vessel, at least one ethylenically unsaturated organic monomer having at least one ethylenical double bond in the presence of a catalyst in the solution of hydrogen in the inert organic solvent, to thereby produce a polymer of the ethylenically unsaturated organic monomer, while controlling the molecular weight of the polymer in the presence of hydrogen dissolved in the inert organic solvent.

In the polymer-producing method of the present invention, the ethylenically unsaturated organic monomer is preferably selected from the group consisting of non-cyclic monoolefines, cyclic monoolefins, conjugated diene monomers, aromatic vinyl compounds, and non-conjugated diolefin compounds.

In the polymer-producing method of the present invention, the conjugated diene monomers are preferably selected from the group consisting of 1,3-butadiene, isoprene, 1,3-pentadiene, 2-ethyl-1,3-butadiene, 2,3-dimethylbutadiene, 2-mehylpentadiene, 4-mehtylpentadiene, and 2,4-hexadiene.

In the polymer-producing method of the present invention, the inert organic solvent preferably comprises at least one member selected from aromatic hydrocarbons having 6 to 12 carbon atoms, aliphatic saturated hydrocarbons having 4 to 12 carbon atoms, olefinic hydrocarbons having 2 to 12 carbon atoms, halogenated hydrobarbons, mmineral spirits, solvent naphtha and kerosine.

In the polymer-producing method of the present invention, preferably the hydrogen-containing gas fed into the mixing vessel has a partial pressure of hydrogen of 0.0001 to 3 MPa at a temperature of −10 to +90° C., and the content of hydrogen in the inert organic solvent solution is adjusted to 0.1 to 50 ppm by mass.

In the polymer-producing method of the present invention, in the addition-polymerization step, hydrogen present in the inert organic solvent solution is preferably in an amount of 0.01 to 500 milli moles, per mole of the ethylenically unsaturated organic monomer.

In the polymer-producing method of the present invention, the addition polymerization is preferably carried out at a temperature of −100 to 120° C.

In the polymer-producing method of the present invention, preferably the catalyst comprises;
(A) a metallocene complex of a transition metal compound,
(B) an ionic compound produced by a reaction of a non-coordination anionic compound with a cationic compound, and
(C) an organic metal compound of an element of groups I to III of the Periodic Table, and optionally
(D) water.

In the polymer-producing method of the present invention, the addition polymerization reaction of the ethylenically unsaturated organic monomer is carried out optionally in the presence of a chain-transfer agent.

In an embodiment of the polymer-producing method of the present invention, the ethylenically unsaturated organic monomer is 1,3-butadiene, the catalyst comprises (a) a metallocene complex of a transition metal compound and (b) at least one member selected from the group consisting of (i) an ionic compound produced by a reaction of a non-coordination anionic compound with a cationic compound, and (ii) an aluminoxane compound; and the resultant polybutadiene resin comprises (I) a lower molecular weight polybutadiene fraction having a weight average molecular weight (Mw) of 305,000 to 700,000, determined by using a gel permeation chromatograph (GPC) and (II) a higher molecular weight polybutadiene fraction having a weight average molecular weight (Mw) of 1,000,000 to 10,000,000, determined by using a gel permeation chromatograph (GPC), each fraction having a molar content of 1,2-structure of 4 to 30%, a molar content of cis-1,4-structure of 65 to 95% and a molar content of trans-1,4-structure of 5% or less.

In the above-mentioned embodiment of the polymer-producing method of the present invention, the polybutadiene fraction (II) is preferably in a content of 0.01 to 50% by mass on the basis of the total mass of the polybutadiene resin.

In the above-mentioned embodiment of the polymer-producing method of the present invention, preferably the addition polymerization reaction of 1,3-butadiene is carried out in the presence of a chain transfer agent, and the lower molecular weight fraction (I) and the higher molecular weight fraction (II) of the polybutadiene are successively produced by chaining the content of the chain transfer agent in the reaction system.

In the above-mentioned embodiment of the polymer-producing method of the present invention, preferably, the addition polymerization reaction of 1,3-butadiene is continuously, carried out in a reactor comprising a first reaction vessel connected in series to a second reaction vessel and the lower molecular polybutadiene fraction (I) is mainly produced in the first reaction vessel and then the higher molecular polybutadiene fraction (II) is mainly produced in the second reaction vessel.

In the above-mentioned embodiment of the polymer-producing method of the present invention, the content of the higher molecular weight polybutadiene fraction (II) in the resultant polybutadiene resin is preferably controlled by adding a polymerization stopper to the reaction system is the second reaction vessel.

In the polymer-producing method of the present invention, in the hydrogen solution-preparing step (1) in the mixing vessel, optionally the hydrogen-containing gas is brought into contact with an inert organic solvent having been mixed with at least one ethylenically unsaturated organic monomer and a catalyst, and after the vapor-liquid phase equilibrium is attained between the vapor phase hydrogen in the hydrogen-containing gas and the liquid phase hydrogen in the solution, the resultant liquid mixture is introduced from the mixing vessel into the reactor.

DESCRIPTION OF THE PREFERRED EMBODIMENTS

Figure 1:
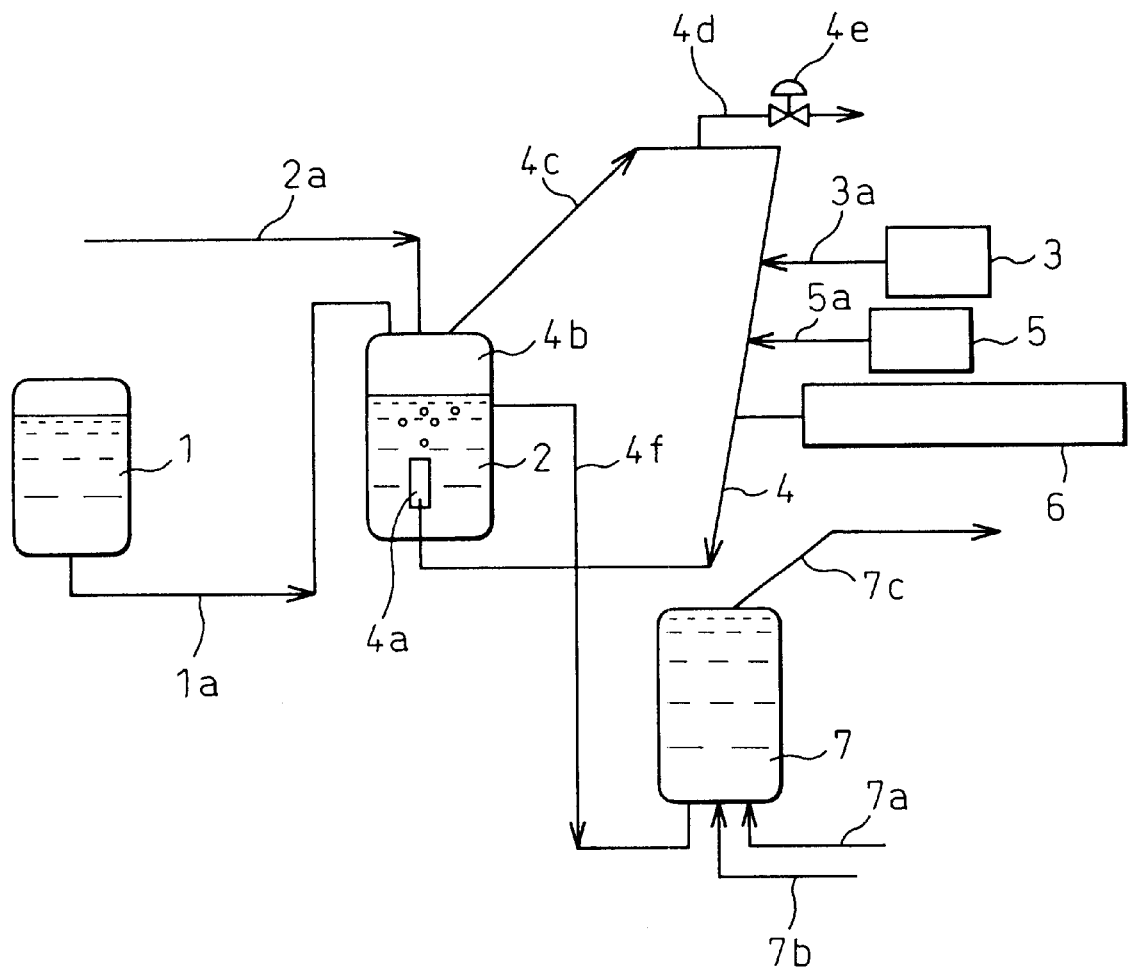
FIG. 1 is an explanatory flow sheet showing an embodiment of the polymer-producing method of the present invention.

The method of the present invention for producing a polymer from at least one ethylenically unsaturated organic monomer comprises (1) a hydrogen solution-preparing step in which a hydrogen-containing gas is brought into contact with an inert organic solvent in a mixing vessel to an extent such that a vapor-liquid phase equilibrium between the vapor phase hydrogen contained in the hydrogen-containing gas and the liquid phase hydrogen in the solution is attained; and (2) an addition polymerization step in which at least one ethylenically unsaturated organic monomer having at least one ethylenical double bond is addition-polymerized in the presence of a catalyst in the solution of hydrogen in the inert organic solvent, in a reactor consisting of at least one reaction vessel, to thereby produce a target polymer of the ethylenically unsaturated organic monomer while the molecular weight of the polymer is controlled in the presence of hydrogen dissolved in the inert organic solvent, to a desired level thereof.

In the method of the preset invention, the ethylenically unsaturated organic monomer is selected from the group consisting of non-cyclic monoolefins, cyclic monoolefins, conjugated diene monomers, aromatic vinyl compounds, and non-conjugated diolefin compounds.

The conjugated diene monomers are preferably selected from the group consisting of 1,3-butadiene, isoprene, 1,3-pentadiene, 2-ethyl-1,3-butadiene, 2,3-dimethylbutadiene, 2-mehylpentadiene, 4-mehtylpentadiene, and 2,4-hexadiene.

The non-cyclic monoolefins are preferably selected from those having 2 to 8 carbon atoms, for example, ethylene, propylene, butene-1, butene-2, isobutene, pentene-1, 4-methylpentene-1, hexene-1 and octene-1.

The cyclic monoolefins are preferably selected from those having 5 to 8 carbon atoms, for example, cyclopentene, cyclohexene and norbornene.

The aromatic vinyl compounds are preferably selected from styrene and α-methylstyrene.

The non-conjugated diolefin compounds are preferably selected from dicyclopentadiene, 5-ethylidene-2-norbornene and 1,5-hexadiene.

Preferably, in the method of the present invention the starting material comprises, as a principal component, at least one conjugated diene compound, for example, 1,3-butadiene and, as an optional component, at least one monomer selected from the non-cyclic monoolefin compounds, cyclic monoolefin compounds, aromatic vinyl compounds and non-conjugated diolefin compounds.

In the polymer-producing method of the present invention, the inert organic solvent preferably comprises at least one member selected from aromatic hydrocarbon having 6 to 12 carbon atoms, aliphatic saturated hydrocarbons having 4 to 12 carbon atoms, cycloaliphatic hydrocarbones having 5 to 12 carbon atoms olefinic hydrocarbons having 2 to 12 carbon atoms, halogenated hydrobarbons, and petroleum solvents.

The aromatic hydrocarbons are preferably selected from benzene, toluene, and xylene, and the aliphatic saturated hydrocarbones are preferably selected from n-hexane, butane, heptane, pentane, octane and decane. The cycloaliphatic hydrocarbones are preferably selected from cyclopentane, cyclohexane, and cyclodecane, and the olefinic hydrocarbones are preferably selected from 1-butene, cis-2-butene, and trans-2-butene. The petroleum solvents include, for example, mineral spirits, solvent naphtha and kerosine, and the halogenated hydrocarbones include, for example, methylene chloride and ethylene chloride.

In the method of the present invention, a solution of hydrogen in an inert organic solvent is prepared by bringing a hydrogen-containing gas into contact with the inert organic solvent in a mixing vessel, to an extent such that a vapor-liquid phase equilibrium between the vapor phase hydrogen contained in the hydrogen-containing gas and the liquid phase hydrogen dissolved in the inert organic solvent is attained. The target concentration of hydrogen in the inert organic solvent is established in response to the types of the ethylenically unsaturated monomer, the inert organic solvent, the catalyst and the target polymer and the operational conditions (for example, temperature and pressure) of steps (1) and (2). For example, in step (1), the partial pressure of hydrogen in the hydrogen-containing gas is 0.0001 to 3 MPa preferably 0.001 to 0.3 MPa and the hydrogen-containing gas temperature is −10 to +90° C., preferably +5 to +60° C. The concentration of hydrogen in the solution in the inert organic solvent in the vapor-liquid phase equilibrium dends on the partial pressure and temperature of hydrogen in the hydrogen-containing gas and the temperature of the inert organic solvent. Usually, the hydrogen concentration of the solution in the inert organic solvent is preferably 0.1 to 50 ppm by mass.

To prepare the solution of hydrogen in the inert organic solvent, usually by passing the hydrogen-containing gas in the form of bubbles through the inert organic solvent, or to increase the contact surface area between the hydrogen-containing gas and the inert organic solvent, and to shorten the vapor-liquid phase equilibrium-attaining time, wetting wall surfaces or fillers are utilized.

The solution of hydrogen in the inert organic solvent under the vapor-liquid phase equilibrium is fed to the addition-polymerization step, and mixed with an ethylenically unsaturated organic monomer, for example, a conjugated diene compound and a catalyst to provide a reaction system. In the reaction system for the addition polymerization step, the amount of hydrogen in the solution is preferably per mole of the ethylenically unsaturated monomer, 500 milli moles or less, or 12 liters or less at 20° C. under a 101,325 Pa (1 atmosphere), more preferably 50 milli moles or less or 2 liters or less at 20° C. under 101,325 Pa (1 atmosphere), still more preferably 0.005 to 20 milli moles or 0.0001 to 0.48 liter at 20° C. under 101,325 Pa (1 atmosphere).

In the method of the present invention, the hydrogen solution-preparing step (1) enables the hydrogen dissolved in the inert organic solvent to be uniformly distributed, as a molecular weight-modifier for the target polymer, in the addition polymerization system of step (2).

In the method of the present invention, the catalyst for the addition polymerization of the ethylenically unsaturated organic monomer, for example, a conjugated diene compound, preferably comprises;

(A) a metallocene complex of a transition metal compound, (B) an ionic compound produced by a reaction of a non-coordination anionic compound with a cationic compound, and (C) an organic metal compound of an element of groups I to III of the Periodic Table.

The metallocene complex (A) of a transition metal compound is preferably selected from metallocene complexes of compounds of transition metals of Group III to VIII of the Periodic Table, for example, metallocene complexes of compounds of transition metals of Group IV of the Periodic Table, for example, titanium and zirconium (for example, Cp TiCl$_3$, etc); metallocene complexes of compounds of transition metals of Group V of the Periodic Table, for example, vanadium, niobium and tantalum; metallocene complexes of compounds of transition metals of Group VI of the Periodic Table, for example, chromium; metallocene complexes of compounds of transition metals of Group VIII of the Periodic Table, for example, cobalt, and nickel; and metallocene complexes of compounds of transition metals of Group III of the Periodic Table, for example, neodymium, samarium and yttrium.

Among the above-mentioned metallocene complexes (A), the metallocene complexes of compounds of the Group V transition metals of the Periodic Table are preferably employed for the method of the present invention.

The metallocene complexes of the compounds of Group V transition metals of the Periodic Table include the following complexes.

(1) RM.La (2) $R_nMX_{2-n}$.La (3) $R_nMX_{3-n}$.La (4) RMX$_3$.La (5) RM(O)X$_2$.La (6) $R_nMX_{3-n}$(NR')

Among the above-mentioned metallocene complexes, those of the formulae RM.La, RMX$_3$.La, RM(O)X$_2$.La are preferably utilized for the method of the present invention.

In the above-mentioned formulae, n represents an integer of 1 or 2, a represents an integer of 0.1 or 2, M represents a compound of transition metal of Group V of the Periodic Table, for example, vanadium (V), niobium, (Nb) or tantalum (Ta), preferably vanadium (V), and R represents cyclopentadienyl, substituted cyclopentadienyl groups, indenyl, substituted indenyl groups, fluorenyl or substituted fluorenyl groups.

In the substituted cyclopentadienyl groups, the substituted indenyl groups and the substituted fluorenyl group, the substituents include, for example, straight or branched chain aliphatic hydrocarbon groups, for example, methyl, ethyl, propyl, iso-propyl, n-butyl, iso-butyl, sec-butyl, tertiary-butyl and hexyl; aromatic hydrocarbon groups, for example, phenyl, tolyl, naphthyl, and benzyl groups, and silicon atom-substituted hydrocarbon group, for example, trymethylsilyl group; cross-linked cyclopentadienyl groups in which the cyclopentadienyl group is cross-linked to a portion of the X groups through a cross-linking agent, for example, dimethylsilyl.

Examples of the substituted cyclopentadienyl group are a methylcyclopentadienyl group, a 1,2-dimethylcyclopentadienyl group, a 1,3-dimethylcyclopentadienyl group, and a 1,3-di(tert-butyl) cyclopentadienyl group.

X represents a hydrogen, a halogen atom, a hydrocarbon group having 1 to 20 carbon atoms, an alkoxy group or an amino group. When two or more X groups are contained in a complex, the plurality of X groups may be the same as or different from each other. Among the above-mentioned atoms and groups for the X, a hydrogen atom, a fluorine atom, a chlorine atom, a bromine atom, a methyl group, an ethyl group, a butyl group, a methoxy group, a dimethyl amino group and a diethylamino group are preferably employed.

L represents a Lewis base which is an inorganic or organic compound capable of coordinating with metals and having a Lewis basic property. Among the above-mentioned Lewis base compounds, the Lewis base compounds having no activated hydrogen atom are preferably used for the present invention. Particularly, the Lewis base compound is preferably selected from ether, ester, ketone, amine, phosphine and silyloxy compounds and olefin, diene and aromatic compounds and alkyne compounds.

In the formula (6), NR' represents an imide group and R' represents a hydrocarbon substituents having 1 to 25 carbon atoms. Particularly, R' represents straight chain and branched aliphatic hydrocarbon groups, for example, methyl, ethyl, propyl, iso-propyl, n-butyl, iso-butyl, sec-butyl groups; aromatic hydrocarbon groups, for example, phenyl and tolyl groups, and silicon-containing hydrocarbon groups, for example, trimethylsilyl group.

In the metallocene complexes (A) of the Group V transition metal compounds of the Periodic Table, the transition metal is preferably vanadium. The metallocene complexes are preferably selected from, for example, those of the formulae:

RV.La,

RVX.La,

R$_2$V.La,

RVX$_2$.La,

R$_2$VX.La,

RVX$_2$.La, and

RV(O)X$_2$-La, and more preferably from those of the formulae:

RV.La and

RVX$_2$.La

In the metallocene complexes of the formula (1): RM.La, the compounds of the Group V transition metal of the Periodic Table containing a cycloalkadienyl group as a ligand and having an oxidation number of +1 include, for example, cyclopentadienyl(benzene) vanadium, cyclopentadienyl(toluene) vanadium, cyclopentadienyl (xylene) vanadium, cyclopentadienyl(trimethylbenzene) vanadium, cyclopentadienyl(hexamethylbenzene) vanadium, cyclopentadienyl(naphthalene) vanadium.

In the compounds of the formula (2): $R_n MX_{2-n}$.La, when n=1, namely only one cycloalkadienyl group is contained as a ligand, as another σ bond ligand, a hydrogen atom, a halogen atom, for example, a chlorine, a bromine or an iodine atom, a hydrocarbon group, for example, a methyl or phenyl group, an hydrocarbonoxy group, for example, a methoxy group or a hydrocarbonamino group, for example, a dimethylamino or a diethylamino group.

The metallocene complexes of the formula (2) may contain, as another ligand, a neutral lewis base for example, an amine, an amide, a phosphine, an ether, a ketone, an ester, an olefin, a diene, an aromatic hydrocarbon or an alkyne compound. The Lewis base ligands containing no activated hydrogen are particularly preferred.

In the metallocene compound of the formula (2), $R_n MX_{2-n}$.La, when n=2, namely, two cycloalkadienyl groups are contained as a ligands, the two cycloalkadienyl groups may be cross-linked with each other through a cross-linking group, for example, a Me$_2$Si group, a dimethylmethylene group, a methylphenylmethylene group, a diphenylmethylene group, an ethylene group and a substituted ethylene group.

In the metallocene complexes of the formula (2), $R_n MX_{2-n}$.La, examples of compounds of Group V transition metals of the Periodic Table containing only one (n=1) cycloalkadienyl group, as a ligand and having an oxidation number of +2 are, chlorocyclopentadienyl(tetrahydrofuran) vanadium, chlorocyclopentadienyl(trimethylphosphine) vanadium, chlorocyclopentadienyl-bis(trimethylphosphine) vanadium, chlorocyclopentadienyl(1,2-bis-dimethylphosphinoethane) vanadium, chlorocyclopentadienyl(1,2-bis-diphenylphosphinoethane) vanadium.

In the metallocene complexes of the formula (2), $P_n MX_{2-n}$.La, when =2, examples of the compounds of the Group V transition metals of the Periodic Table containing two cycloalkadienyl group as ligands and having an oxidation number of ±2, are biscyclopentadienyl vanadium, bis(methylcyclopentadienyl) vanadium, bis(1,2-dimethylcyclopentadienyl) vanadium, bis(1,3-dimethylcyclopentadienyl) vanadium, bis(1-methyl-3-butylcyclopentadienyl) vanadium, and bis(tetramethylcyclopentadienyl) vanadium.

In the metallocene complexes of the formula (3), $R_n MX_{3-n}$.La, when n=1, examples of the complexes are dichloride compounds, for example, cyclopentadienyl vanadium dichloride, methylcyclopentadienyl vanadium dichloride, (1,3-dimethylcyclopentadienyl) vanadium dichloride; and dimethyl compounds which are obtained by replacing the chlorine atoms of the dichloride compounds by methyl groups.

In the metallocene complexes of the formula (3) (n=1), the group R and the group X may be connected to each other through a hydrocarbon group or a silyl group. Examples of the complexes are amidochloride compounds, for example, (t-butylamido)dimethyl($\eta^5$-cyclopentadienyl) silane vanadium chloride, and (t-butylamido)dimethyl(tetramethyl-$\eta^5$-cyclopentadienyl) silane vanadium chloride, and methyl compounds obtained by replacing the chlorine atom of the aminde chloride compound by a methyl group.

The metallocene complexes of the formula (3) (n=1) further include alkoxide compounds, for example, cyclopentadienylvanadium dimethoxide, cyclopentadienylvanadium di-isopropoxide, cyclopentadienyl vanadium di-tert-butoxide, and cyclopentadienyl vanadium diphenoxide, and methyl compounds which is obtained by replacing the alkoxide group of the alkoxide compound by a methyl group.

Also, the metallocene complexes of the formula (3) (n=1) further include bis amide compounds, for example, (cyclopentadienyl)bis(diethylamido) vanadium and (cyclopentadienyl)bis(di-isopropylamido) vanadium.

In the metallocene complexes of the formula (3), when n=2, the examples of the complexes include chloride compounds, for example, dicyclopentadienyl vanadium chloride, and bis(methylcyclopentadienyl) vanadium chloride, and methyl compound which is obtained by replacing the chlorine atom of the chloride compounds by a methyl group.

The metallocene complexes of the formula (3), n=2, include alkoxide compounds, for example, dicyclopentadienyl vanadium methoxide and dicyclopentadienyl vanadium iso-propoxide.

In the metallocene complexes of the formula (3), n=2, the groups R may be cross-linked through a hydrocarbon group or a silyl group. This type of complexes include chloride compounds, for example, dimethyl bis($\eta^5$-cyclopentadienyl) silane vanadium chloride, and methyl compounds which is obtained by replacing the chlorine atom of the chloride compounds by a methyl group.

The metallocene complexes of the formula (4), RMX$_3$.La includes the compounds of Groups (i) to (xvi) shown below.

(i) cyclopentadienyl vanadium trichloride, and mono-substituted cyclopentadienyl vanadium trichloride, for example, methylcyclopentadienyl vanadium trichloride and ethylcyclopentadienyl vanadium trichloride.

(ii) 1,2-di-substituted cyclopentadienyl vanadium trichloride, for example, (1,2-dimethylcyclopentadienyl) vanadium trichloride.

(iia) 1,3-di-substituted cyclopentadienyl vanadium trichloride, for example, (1,3-dimethylcyclopentadienyl) vanadium trichloride.

(iii) 1,2,3-tri-substituted cyclopentadienyl vanadium trichloride, for example, (1,2,3-trimethylcyclopentadienyl) vanadium trichloride.

(iv) 1,2,4-tri-substituted cyclopentadienyl vanadium trichloride, for example, (1,2,4-trimethylcyclopentadienyl) vanadium trichloride.

(v) Tetra-substituted cyclopentadienyl vanadium trichloride, for example, (1,2,3,4-tetramethylcyclopentadienyl) vanadium trichloride.

(vi) Penta-substituted cyclopentadienyl vanadium trichloride, for example, (pentamethylcyclopentadienyl) vanadium trichloride.

(vii) Indenyl vanadium trichloride.

(viii) substituted indenyl vanadium trichloride, for example, (2-methylindenyl) vanadium trichloride.

(ix) Monoalkoxide, dialkoxide and trialkoxide compounds obtained by replacing the chlorine atoms of the compounds of Groups (i) to (viii) by alkoxy groups, for example, cyclopentadienyl vanadium tri-tert-butoxide, cyclopentadienyl vanadium isopropoxide, cyclopentadienyl vanadium dimethoxychloride, cyclopentadienyl vanadium dimethoxy chloride, trimethylsilylcyclopentadienyl vanadium isopropoxychloride.

(x) Methyl compounds obtained by replacing the chlorine atoms of the compounds of Group (i) to (ix) by methyl groups.

(xi) Cross-linked compounds obtained by cross-linking the groups R in the metallocene complexes through a hydrocarbon or silyl group, to each other, for example, (tert-butylamido)dimethyl($\eta^5$-cyclopentadienyl) silane vanadium chloride.

(xii) Methyl compounds corresponding to the compounds of Group (xi) except that the chlorine atoms of the Group (xi) compounds are replaced by methyl groups.

(xiii) Monoalkoxy compounds and dialkoxy compounds corresponding to Group (xi) compound except that the chlorine atoms of the Group (xi) compounds are replaced by alkoxy groups.

(xiv) Methyl compounds corresponding to the trichloride compound of Group (xiii) except that the mono chlorine atom of the Group (xiii) compounds are replaced by methyl groups.

(xv) Amide compounds corresponding to the chloride compounds of Group (i) to (viii) except that the chlorine atoms of the Group (i) to (viii) compounds are replaced by amide groups, for example, cyclopentadienyl tris (diethylamido) vanadium, silylcyclopentadienyl tris (isopropylamido) vanadium, cyclopentadienyl tris(n-octylamido) vanadium, cyclopentadienyl bis(diethylamido) vanadium chloride.

(xvi) Methyl compounds corresponding to the amide compound of Group (xv) except that the chlorine atoms of the Group (xv) compounds are replaced by methyl groups.

The metallocene complexes of the formula (5) include, for example, cyclopentadienyloxovanadium dichloride, methyl-cyclopentadienyloxovanadium dichloride and benzylcyclopentadienyloxovanadium dichloride. These chloride compounds may be modified to methyl compounds by replacing the chlorine atoms of the chloride compounds by methyl groups.

In the metallocene complexes of the formula (5), the group R and the group X may be cross-linked through a hydrocarbon group or a silyl group. The cross-linked compounds are, for example, amidechloride compounds, for example, (tert-butylamido)dimethyl($\eta^5$-cyclopentadienyl) silaneoxovanadium chloride. The chlorine atom in the amidechloride compounds may be replaced by methyl groups, to form methyl compounds.

The metallocene complexes of the formula (5) include (cyclopentadienyl)bis(diethylamido) oxovanadium.

The metallocene complexes of the formula (6) $R_nMX_{3-n}$ (NR') include, for example, cyclopentadienyl(methylimido) vanadium dichloride, cyclopentadienyl(phenylimido) vanadium dichloride, and cyclopentadienyl(2,6-dimethylphenylimido) vanadium dichloride.

In the metallocene complexes of the formula (6), the group R and the group X may be cross-linked to each other through a hydrocarbon group or a silyl group. The cross-linked complexes include, for example, (tert-butylamido) dimethyl($\eta^5$-cyclopentadienyl) silane (phenylimido) vanadium chloride. The chlorine atom of the above-mentioned complexes may be replaced by methyl group, to provide methyl compounds. In the catalyst for the addition-polymerization raction, the ionic compound (B) is a reaction product of a non-coordination anionic compound with a cationic compound.

The non-coodination anionic compound is preferably selected from borate esters, for example, tetra(phenyl) borate, tetra(fluorophenyl) borate, tetrakis(difluorophenyl) borate, tetrakis(trifluorophenyl) borate, tetrakis (tetrafluorophenyl) borate, tetrakis(pentafluorophenyl) borate, and tetrakis(3,5-bistrifluoromethylphenyl) borate.

The cationic compounds preferably include carbonium cationic compounds, oxonium cationic compounds, ammonium cationic compounds, phosphonium cationic compounds, cycloheptyltrienyl cationic compounds and transition metal-containing ferrocenium cationic compounds.

The carbonium cationic compounds preferably include tri-substituted carbonium cationic compounds, for example, triphenylcarbonium cationic compounds and tris(substituted phenyl) carbonium cationic compounds, for example, tri (methylphenyl) carbonium cationic compounds and tris (dimethylphenyl) carbonium cationic compounds.

The ammonium cationic compounds preferably include trialkylammonium cationic compounds, for example, trimethylammonium cationic compound, triethylammonium cationic compounds, tripropylammonium cationic compounds, tributylammonium cationic compounds and tri(n-butyl) ammonium cationic compounds; and N,N-dialkylanilinium cationic compounds and dialkyl ammonium cationic compounds, for example, N,N-dimethylanilinium cationic compounds, N,N-diethylanilinium cationic compounds and N,N-2,4,6-pentamethyl anilinium cationic compounds.

The ionic compound (B) can be produced by reacting at least one above-mentioned non-coordination anionic compound with at least one above-mentioned cationic compounds.

Particularly, the ionic compound (B) is preferably selected from triphenylcarbonium-tetrakis (pentafluorophenyl) borate and triphenylcarbonium tetrakis (fluorophenyl) borate.

The ionic compounds as mentioned above may be employed alone or in a combination of two or more thereof.

The organic metal compounds (C) of the Group I to III metals usable as component of the catalyst for the method of the present invention are preferably selected from organic aluminum compounds, organic lithium compounds, organic magnesium compounds, organic zinc compounds and organic boron compounds. For example, the organic lithium compounds include methyl lithium, butyl lithium, phenyl lithium, benzyl lithium, neopentyl lithium, trimethylsilylmethyl lithium, and bis trimethylsilylmethyl lithium; the organic magnesium compounds include dibutyl magnesium and dihexyl magnesium; the organic zinc compounds include diethyl zinc and dimethyl zinc; organic aluminum compounds include trimethyl aluminum, triethyl aluminum, triisobutyl aluminum, trihexyl aluminum, trioctyl aluminum and tridecyl aluminum; and the organic boron compounds include boron trifluoride and triphenyl boron.

Also, the organic Group I to III metal compounds (C) further include organic metal halides, for example, ethyl magnesium chloride, butylmagnesium chloride, dimethylaluminum chloride, diethylaluminum chloride, sesquiethyl aluminum chloride and ethylaluminium dichloride; and hydrogenated organic metal compounds, for example, diethylaluminum hydride and sesquiethyl aluminum hydride.

In the organic compounds (C) of the metals of Groups I to III of the Periodic Table, the organic aluminum compounds are preferred. In the organic aluminum compounds, preferably tri alkyl aluminums, for example, trimethylaluminum, triethylaluminum and triisopropylaluminum; organic aluminum halides, for example, dimethylaluminum chloride, diethylaluminum chloride, sesquiethylaluminum chloride, ethylaluminum dichloride; and hydrogenated organic aluminum compounds, for example, diethylaluminum hydride and sesquiethylaluminum hydride.

The organic metal compound (C) includes alumoxane. The alumoxane is produced by reaction of an organic aluminum compound with a condensing agent, for example, water; represented by a general formula: $(-Al(R^2)O-)_n$ wherein $R^2$ represents a hydrocarbon group having 1 to 10 carbon atoms, which hydrocarbon group may be substituted one or more substituents selected from halogen atoms and alkoxy groups having 1 to 10 carbon atoms, and n is an integer of 5 or more, preferably 10 or more, and includes linear aluminoxane and cyclic aluminosane. The hydrocarbon group represent by $R^2$ is preferably selected from methyl, ethyl, n-propyl and isopropyl groups, more preferably methyl and ethyl groups.

In the production of the aluminoxane, the organic aluminum compounds used as a starting material are preferably trialkylaluminums, for example, trimethylaluminum, triethylaluminum and triisobutylaluminum or a mixture of two or more thereof.

An aluminoxane produced from a mixture of trimethylaluminum and tributylaluminum can be advantageously used as a component (C) of the catalyst in the method of the present invention.

As a condensing agent for the aluminoxane, typically water is employed. Alternatively, absorbed water, in inorganic substances and diol compounds which can be condensate-reacted with the trialkylaluminums, may be utilized as a condensing agent.

The above-mentioned organic metal compounds may be employed alone or in a mixture of two or more thereof.

In the catalyst for the addition polymerization reaction of the present invention, the metallocene complex component (A) and the ion compound component (B) are preferably employed in a molar ratio (A)/(B) of 1:0.1 to 1:10, more preferably 1:0.2 to 1:5.

Also, the metallocene complex component (A) and the organic metal compound component (C) is preferably 1:0.1 to 1:1,000, more preferably 1:10 to 1:1,000.

When water (D) is employed as a component of the catalyst, the molar ratio (C)/(D) of the organic metal compound component (C) to the water component (D) is preferably 0.66:1–5:1, more preferably 0.7:1 to 1.5:1, still more preferably 0.8:1 to 1.5:1.

In the preparation of the catalyst, there is no specific limitation to the sequence in which the components are mixed with one another. For example, the catalyst may be prepared in the following sequence.

(1) The water component (D) is mixed into a monomer or a monomer mixture to be polymerized, the organic metal compound component (C) was added to the mixture (monomer (S)+(D)), and then the metallocene complex component (A) and the ionic compound component (B) are mixed in any sequence into the admixture (monomer (S)+(D)+(A)+(B)).

(2) In the monomer or monomer mixture to be polymerized, the water component (D) and the organic metal compound component (C) are mixed and thereafter, the resultant mixture is admixed with the metallocene complex component (A) and the ionic component (B), in any sequence.

The monomer or monomer mixture used in the preparation of the catalyst may be in the entire amount of the monomer or monomer mixture to be addition-polymerized by the method of the present invention or in a partial amount thereof. In the later case, a portion of the monomer or monomer mixture may be employed in the preparation of the catalyst and the remaining portion thereof is supplied to the addition polymerization procedure.

In the method of the present invention, the above-mentioned catalyst is used in the presence of hydrogen dissolved in the inert organic solvent, to polymerize at least one ethylenically unsaturated organic monomer to produce a polymer having a controlled molecular weight.

The solution of hydrogen in the inert organic solvent is prepared by the procedure as explained above. The preparation of the hydrogen solution in step (1) may be carried out in the presence of the organic metal compound component (C) and/or a portion of a monomer feed consisting of at least one ethylenically unsaturated organic monomer, each dissolved in the inert organic solvent.

In step (2) of the method of the present invention, at least one ethylenically unsaturated organic monomer dissolved in the inert organic solvent is addition-polymerized in the presence of the catalyst and in the presence of hydrogen by a solution polymerization procedure.

The polymerization temperature is preferably −100 to +120° C., more preferably −50 to +100° C. and the polymerization time is preferably 10 minutes to 12 hours, more preferably 30 minutes to 6 hours.

In the addition polymerization step (2), a chain-transfer agent is optionally contained in the reaction mixture to control the distribution in molecular weight of the resultant polymer. Also, a polymerization stopper comprising, for example, at least one member selected from alcohols, organic aluminum compounds and water, may be added to the reaction mixture.

After the polymerization step (2) is completed, the reactor (reactor vessels) is opened to the ambient atmosphere the resultant reaction mixture is collected from the reactor and subjected to a refining procedures including washing and drying operation, to collect the target polymer.

When the starting ethylenically unsaturated monomer is 1,3-butadiene, the resultant polybutadiene resin preferably has a molar content of 1,2-structure of 4 to 30%, by more preferably 5 to 25%, still more preferably 7 to 15%, a molar content of cis-1,4-structure of 65 to 95%, more preferably 70 to 95%, still more preferably 70 to 92%, and a content of trans-1,4-structure of 5% or less, more preferably 4.5% or less, still more preferably 0.5 to 4%.

When the micro structure of the resultant polybutadiene resin falls outside the above-mentioned range, the resultant polymer resin may exhibit an unsatisfactory reaction property, for example, a reactivity in graft polymerization and/or a cross-linking-reactivity, and the polybutadiene resin composition containing an additive for rubber materials may exhibit an unsatisfactory rubber property, insufficiently balanced mechanical properties and appearance.

The method of the present invention enables a polybutadiene resin having an intrinsic viscosity [η] of 0.1 to 20, determined in toluene at a temperature of 30° C. to really obtained. Also, the method of the present invention enables a polybutadiene resin having a weight average molecular weight of 10,000 to 4,000,000, determined by the gel permeation chromatography using a polystyrene as a standard substance to be really obtained.

The above-mentioned polybutadiene resin produced by the method of the present invention is useful as an impact resistance-enhancing agent for polystyrene resin articles.

An embodiment of the method of the present invention is shown in FIG. 1. Referring to FIG. 1, a mixture of an inert organic solvent with an organic metal compound component (C) and optionally water is fed from a solvent storage tank 1 in which the component (D) is aged in the solvent into a mixing vessel 2 through a conduit 1a, and an ethylenically unsaturated monomer is fed from a supply source (not shown in FIG. 1) into the mixing vessel 2 through a conduit 2a and dissolved in the inert organic solvent mixture.

Separately, a hydrogen gas is introduced from a hydrogen gas-supply source 3 into a conduit 4 through a conduit 3a, and a nitrogen gas is introduced from a nitrogen gas-supply source 5 into the conduit 4 through a conduit 5a. The hydrogen gas and the nitrogen gas are mixed with each other and a content of hydrogen in the hydrogen-nitrogen mixed gas is measured by a gas chromatographic analizer 6 connected to the conduit 4. The mixed gas is introduced into the mixing vessel 2 and bubbled through a bubbling end 4a of the conduit 4. The mixed gas bubbles flow up to a top portion 4b of the mixing vessel, and a portion of hydrogen in the mixed gas dissolves in the monomer-mixed solvent. The remaining mixed gas is delivered from the top portion 4b of the mixing vessel 2 through a conduit 4c and returned to the conduit 4 and further mixed with hydrogen and nitrogen gases.

Optionally, a portion of the remaining mixed gas delivered through the conduit 4c is discharged through a conduit 4d and a valve 4e. The concentration of hydrogen dissolved in the inert organic solvent mixture is controlled to a desired level by controlling the content of hydrogen in the mixed gas to be introduced into the mixing vessel 2 by the analizer 6.

The hydrogen-dissolved, monomer-mixed inert organic solvent mixture is delivered from the mixing vessel 2 through a conduit 4f and introduced into a reactor 7 to which a conduit 7a for feeding a metallocene complex component (A) and a conduit 7b for feeding an ionic compound component (C) are connected. In the reactor 7, the monomer is addition polymerized in the presence of a catalyst comprising the metallocene complex component (A), the ionic compound component (B) and the organic metal compound component (C), and in the presence of hydrogen dissolved in the inert organic solvent. The resultant reaction mixture containing the target polymer is delivered and collected from the reactor 7 through a conduit 7c.

In accordance with the method of the present invention, a polybutadiene resin comprising two polybutadiene fractions different in molecular weight from each other and having an improved cold flow property can be produced.

Namely, in an embodiment of the method of the present invention, the ethylenically unsaturated organic monomer is 1,3-butadiene, the catalyst comprises (a) a metallocene complex of a transition metal compound and (b) at least one member selected from the group consisting of (i) an ionic compound produced by a reaction of a non-coordination anionic compound with a cationic compound, and (ii) an aluminoxane compound; and the resultant polybutadiene resin comprises (I) a lower molecular weight polybutadiene fraction having a weight average molecular weight (Mw) of 305,000 to 700,000, determined by using a gel permeation chromatograph (GPC) and (II) a higher molecular weight polybutadiene fraction having a weight average molecular weight (Mw) of 1,000,000 to 10,000,000, determined by using a gel permeation chromatograph (GPC), each fraction having a molar content of 1,2-structure of 4 to 30%, a molar content of cis-1,4-structure of 65 to 95% and a molar content of trans-1,4-structure of 5% or less.

The lower molecular weight fraction (I) and the higher molecular weight fraction (II) can be continuously produced by controlling the concentration of hydrogen (serving as a chain transfer agent) in the reactor. For example, in the addition polymerization procedure, the lower molecular weight fraction (A) is produced in an initial stage of the polymerization step (2) at a higher concentration of hydrogen in the reaction mixture, and then in the later stage of the polymerization step (2), the concentration of hydrogen in the reaction mixture is reduced to produce the higher molecular weight fraction. Alternatively, the higher molecular weight fraction (II) is produced in an initial stage of the polymerization step at a relatively low concentration of hydrogen, and then the hydrogen concentration is increased to produce the lower molecular weight fraction.

To produce the lower molecular weight polybutadiene fraction (A), the concentration of hydrogen in the polymerization reaction mixture is preferably controlled to 1 to 30 milli moles/liter, more preferably 2 to 20 milli moles/liter. Also, to produce the higher molecular weight polybutadiene fraction (II), the concentration of hydrogen in the polymerization reaction mixture is preferably controlled to 0.1 to 10 milli moles/liter, more preferably 0.5 to 5 milli moles/liter.

In each of the resultant lower and higher molecular weight polybutadiene fractions (I) and (II), preferably the content of 1,2-structure is 1 to 30%, more preferably 4 to 30%, the content of cis-1,4-structure is 65 to 95%, more preferably 70 to 95%, and the content of trans-1,4-structure is 5% or less, more preferably 4% or less.

Also, the lower molecular weight polybutadiene fraction (I) preferably has a weight average molecular weight (MW-I) of 305,000 to 700,000, more preferably 350,000 to 600,000, and the higher molecular weight polybutadiene fraction (II) preferably has a weight average molecular weight (MW-II) of 1,000,000 to 10,000,000, more preferably 1,500,000 to 8,000,000, each determined by a gel permeation chromatograph (GPC).

Preferably, with respect to the content ratio of the lower molecular weight polybutadiene fraction (I) to the higher molecular weight polybutadiene fraction (II) in the polybutadiene resin, preferably, the content of the fraction (II) is 0.5 or more but not more than 40% by mass, more preferably 1.0 or more but not more than 25% by mass. If the content of the fraction (II) is 40% by mass or more, the resultant polymer resin may exhibit an insufficient processability (workability). Also, if the content of the fraction (II) is less than 0.5% by mass, the resultant resin may exhibit an unsatisfactory cold flow property.

Figure 2:
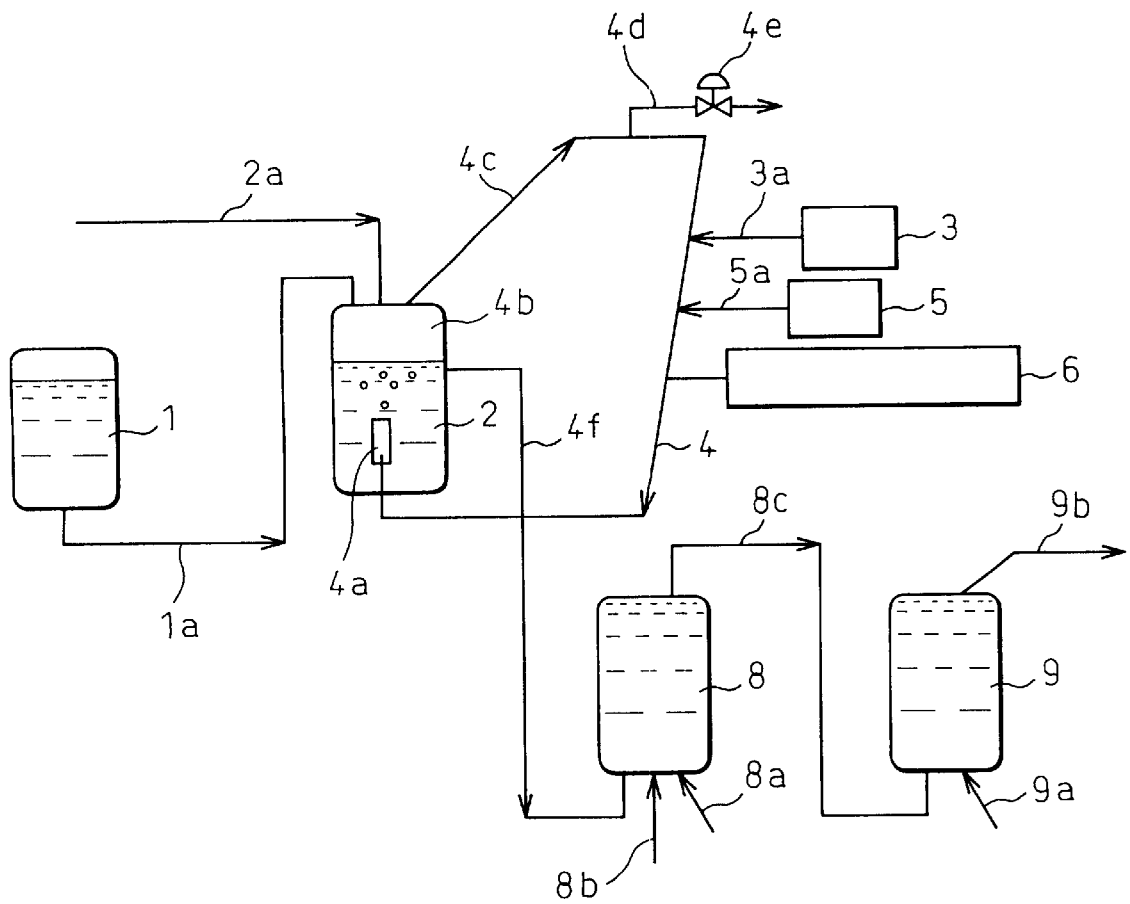
FIG. 2 is an explanatory flow sheet showing another embodiment of the polymer-producing method of the present invention.

The above-mentioned embodiment of the method of the present invention may be carried out in accordance with the flow sheet shown in FIG. 2.

Referring to FIG. 2, in the solvent storage tank 1 and the mixing vessel 2, the same procedures as in FIG. 1 are carried out, and thereafter, the hydrogen-dissolved, monomer(1,3-butadiene)-mixed inert organic solvent mixture prepared in the mixing vessel 2 is delivered from the mixing vessel 2 through a conduit 4f and introduced into a first reaction vessel 8, and is mixed with a metallocene complex component (A) fed through a conduit 8a and a cationic compound component (B) fed through a conduit 8b. The 1,3-butadiene monomer is addition-polymerized in the first reaction vessel 8 in the presence of the catalyst and in the hydrogen (a chain transfer agent). The resultant reaction mixture is delivered from the first reaction vessel 8 through a conduit 8c and introduced into a second reaction vessel 9 and the addition polymerization is further carried out. Optionally a polymerization stopper is fed into the second reaction vessel 9 through a conduit 9a and the resultant reaction mixture containing the target polybutadiene resin is delivered and collected from the vessel 9 through a conduit 9b.

Preferably, the lower molecular weight polybutadiene fraction (I) is prepared in the first reaction vessel and successively the higher molecular weight polybutadiene fraction (II) is prepared in the second reaction vessel. The molecular weight of the polybutadiene fractions can be controlled by controlling the content of hydrogen dissolved in the reaction mixture (the inert organic solvent), in the presence of the above-mentioned catalyst.

In the first reaction vessel (the initial stage of the addition polymerization step), hydrogen dissolved in the inert organic solvent preferably exhibits a partial pressure of hydrogen, 0.02 to 0.2 MPa, more preferably 0.03 to 0.1 MPa.

The reaction temperature of the first reaction vessel is preferably −100 to +120° C., more preferably −50 to +100° C.

The reaction pressure of the first reaction vessel is preferably 0.01 to 5 MPa, more preferably 0.1 to 1 MPa.

The reaction temperature of the second reaction vessel is preferably −100 to +120° C., more preferably −50 to +100° C.

The reaction pressure of the second reaction vessel is preferably 0.01 to 5 MPa, more preferably 0.1 to 1 MPa.

In the second reaction vessel, the polymerization stopper is preferably employed at a concentration of 0.0001 to 500 milli moles/liter, more preferably 0.001 to 200 milli moles/liter.

Figure 3:
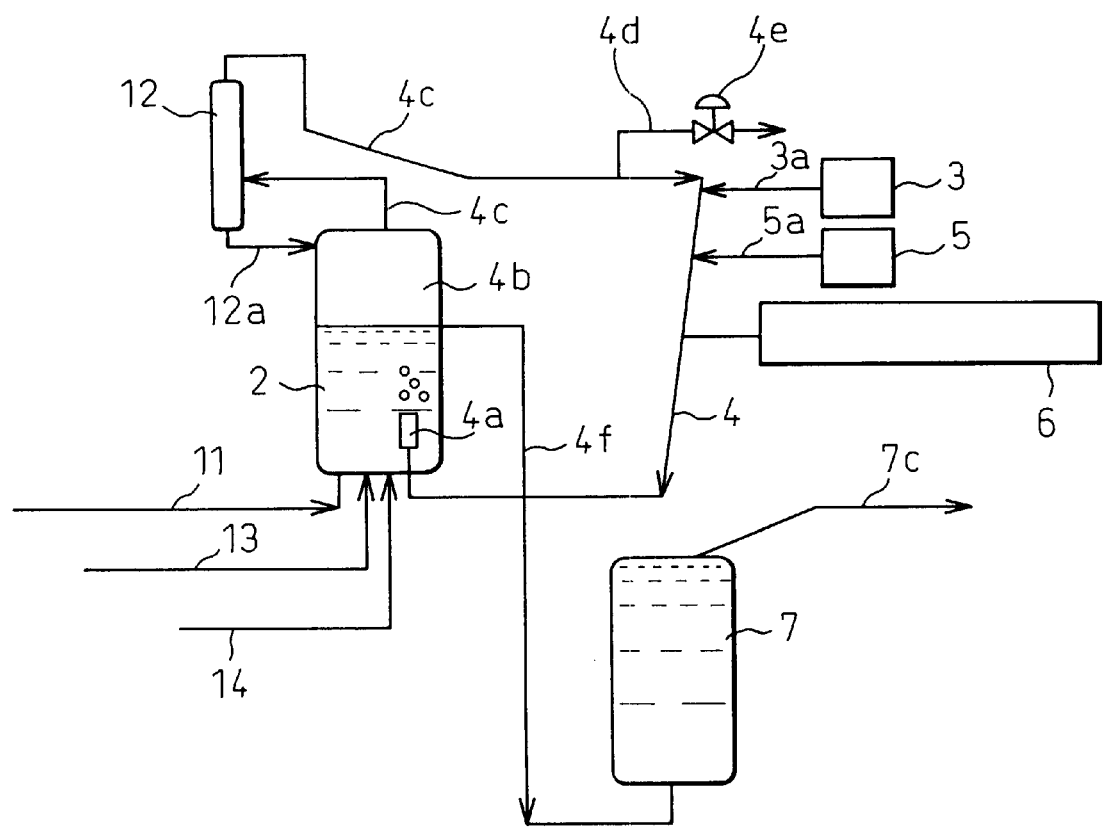
FIG. 3 is an explanatory flow sheet showing still another embodiment of the polymer-producing method of the present invention.

Another embodiment of the method of the present invention is illustrated in FIG. 3.

In this embodiment, in the hydrogen-containing gas-contacting step (1) in the mixing vessel, the hydrogen-containing gas is brought into contact with an inert organic solvent having been mixed with at least one ethylenically unsaturated organic monomer and a catalyst, and after the vapor-liquid phase equilibrium is attained between the vapor phase hydrogen in the hydrogen-containing gas and the liquid phase hydrogen in the solution, the resultant liquid mixture is introduced from the mixing vessel into the reactor.

Referring to FIG. 3, a mixture of at least one ethylenically unsaturated monomer, for example, 1,3-butadiene, with an aged mixture of an inert organic solvent with an organic metal compound component and optionally water, is fed into a mixing vessel 2 through a conduit 11. A hydrogen-nitrogen mixed gas is circulated through the mixing vessel 2 in the same manner as in FIG. 1, except that a gas condenser 12 is arranged in the conduit 4c for delivering the remaining portion of the mixed gas from the top portion 4b of the mixing vessel 2. The gas-condensing product is returned into the mixing vessel 2 through a conduit 12a. The mixing vessel 2 is connected to a conduit 13 for feeding a metallocene complex component (A) and another conduit 14 for feeding a cationic compound component (C) thereinto. In the mixing vessel 2 shown in FIG. 3, hydrogen in the mixed gas can be dissolved in the inert organic solvent and additional polymerization of the monomer can be effected before or after, preferably after, the vapor-liquid phase equilibrium is attained. The reaction mixture prepared in the mixing vessel 2 is introduced into the reactor 7 through the conduit 4f. In reactor 7, the reaction mixture is subjected to further addition polymerization and the resultant reaction mixture is delivered and collected from the reactor 7 through the conduit 7c.

EXAMPLES

The present invention will be further illustrated by the following examples.

In the examples and comparative examples, the following measuremnts were carried out.

(1) Micro structure of polybutadiene resin.

The micro structure of the polybutadiene resin was determined by an infrared absorption spectrophotometric analysis.

The contents of cis-1,4-structure was calculated from a infrared absorption intensity ratio at a wavenumber of 740 $cm^{-1}$, the content of trans-1,4-structure from that at a wavenumber of 967 $cm^{-1}$, and the content of 1,2-structure from that at a wavenumber of 911 $cm^{-1}$.

(2) Intrinsic viscosity [η]

The intrinsic viscosity of the polybutadiene resin was determined in toluene at a temperature of 30° C.

(3) Mooney viscosity [ML]

The Mooney viscosity of the polybutadiene resin was determined at a temperature of 100° C. by using a Mooney plastometer.

(4) Weight average molecular weight

The weight average molecular weight of the polyethylene resin was determined by using a gel permeation chromatographic (GPC) analysis for which a polystyrene was used as a standard substance.

The content ratio of a lower molecular weight polybutadiene fraction (I) to a higher molecular weight polybutadiene fraction (II) was determined from the region areas on a GPC chart corresponding to the contents of the fractions (I) and (II).

(5) Cold flow resistance

A polymer specimen was sucked through a circular orifice having an inside diameter of 6.0 mm under an absolute pressure of 0.035 MPa at a temperature of 50° C. for 10 minutes. The mass of a portion of the polymer specimen sucked through the orifice was measured in the units of g/10 min. The larger the sucked specimen mass, the lower the cold flow resistance of the polymer, namely the higher the deformability of the polymer.

(6) Concentration of hydrogen dissolved in solvent

A sample of a solution of hydrogen in a solvent was placed in an amount of about 1 g in a square box-shaped container having a capacity of one liter from which container air had been removed vacuum. The container was heated at a temperature of 55° C. in a high temperature bath. The vapor generated in the container was taken in an amount of 3 ml by using a gas-tight syringe and subjected to a gas chromatographic analysis. The amount of hydrogen was calculated from the analysis data on the assumement that whole amount of hydrogen and monomer (1,3-butadiene), if any, in the sample was contained in the generated vapor phase.

Examples 1 to 3

In each of Examples 1 to 3, 1,3-butadiene was continuously addition-polymerized in accordance with the process shown in the flow sheet of FIG. 1. Cyclohexane was fed in an amount of 34 liters into a solvent tank 1 and mixed with water in the concentration as shown in Table 1. Then, the mixture was further mixed with 90 ml of a toluene solution of triethylaluminum in a concentration of 0.6 mole/liter, and fully stirred for enough time. The resultant cyclohexane solution and 1,3-butadiene were continuously introduced in a mass ratio of 70:30 into a mixing vessel 2 through conduits 1a and 2a respectively.

A monomer-solvent mixture was provided from 1,3-butadiene and the cyclohexane solution (including water, the triethyl aluminum and toluene) in the mixing vessel 2. The concentrations of triethyl aluminum and water in the reaction mixture were respectively shown in Table 1.

A mixed gas of hydrogen with nitrogen was continuously circulated at a flow rate of about 6 l/h, in terms of flow rate under 0.101325 MPa (1 atm) through a conduit 4, the mixing vessel, and a conduit 4c, and the partial pressure of hydrogen in the mixed gas was measured by the gas chromatograph 6 and controlled based on the measured data to a desired value, to cause hydrogen and nitrogen to be dissolved in the monomer-solvent mixture. Also, in the top portion 4b of the mixing vessel 2, vapors generated from the monomer-solvent mixture was mixed into the hydrogen-nitrogen mixed gas. In the mixing vessel 2, a mixing procedure was carried out at the temperature under the pressure as known in Table 1. Also, in the mixing vessel 2, the partial pressure of hydrogen was controlled to the level shown in Table 1. The hydrogen was dissolved in the monomer-solvent mixture until a vapor-liquid phase equilibrium of hydrogen was attained in response to the partial pressure of hydrogen and the mixing temperature in the mixing vessel 2.

The resultant hydrogen-dissolved monomer-solvent mixture was continuously introduced from the mixing vessel 2 into a reactor 7 through a conduit 4f, and a toluene solution of cyclopentadienylvanadium trichloride (CpVCl$_3$) in a concentration of 2.5 milli mole/liter and a toluene solution of triphenyl carbonium tetrakis (pentafluorophenyl) borate (Ph$_3$CB(C$_6$F$_5$)$_4$) in a concentration of 0.3 milli mole/liter were respectively introduced into the reactor 7 through conduits 7a and 7b and the contents thereof in the reaction mixture in the reactor 7 were adjusted to the values shown in Table 1. The addition polymerization of 1,3-butadiene was carried out in the reactor 7 at a temperature of 40° C. under a pressure of 0.6 MPa as shown in Table 1. The flow rate of the reaction mixture through the reactor 7 was 4.73 liters/hr as shown in Table 1.

After the addition polymerization procedure was completed, the resultant reaction mixture was delivered and collected through a conduit 7c. Then, into the collected reaction mixture, a mixture of ethyl alcohol with heptane in a 50:50 equivalent weight mixing ratio and containing a small amount of 2,6-di-tert-butyl-p-cresol was mixed, the resultant mixture was opened to the ambient atmospheric pressure, and mixed into ethyl alcohol to cause the target polymer to precipitate. The precipitated polymer was collected by filtration and dried.

The collected polymer was subjected to the measurements as mentioned above. It was confirmed that the intrinsic viscosity [η] of the resultant polybutadiene resin in toluene decreased with increase in the partial pressure of hydrogen in the mixing vessel, and a relationship between the partial pressure of hydrogen, and the intrinsic viscosity [η] of the resultant polybutadiene resin was stable, namely the molecular weight of the polybutadiene resin could be stably controlled by controlling the content of hydrogen dissolved in the solvent. The measurement results are shown in Table 1.

TABLE 1

|  | Example No. | | |
|---|---|---|---|
|  | 1 | 2 | 3 |
| Mixing vessel | | | |
| Content of 1,3-butadiene in monomer-solvent mixture (% by mass) | 30 | 30 | 30 |
| Content of triethylaluminum in monomer-solvent mixture (m.mol/l) | 1.03 | 1.03 | 1.03 |
| Content of water in monomer-solvent mixture (m.mol/l) | 1.28 | 1.28 | 1.28 |
| Temperature (° C.) | 15 | 20 | 20 |
| Total pressure (MPa) | 0.3 | 0.3 | 0.3 |
| Partial pressure of hydrogen (MPa) | 0.069 | 0.058 | 0.042 |
| Reactor | | | |
| Temperature (° C.) | 40 | 40 | 40 |
| Total pressure (MPa) | 0.6 | 0.6 | 0.6 |
| Flow rate of reaction mixture (liter/hr) | 4.73 | 4.73 | 4.73 |
| Content of CpVCl$_3$ in reaction mixture (micro mol/liter) | 10 | 10 | 10 |
| Content of Ph$_3$CB(C$_6$F$_5$)$_4$ in reaction mixture (micro mol/liter) | 15 | 15 | 15 |
| Polybutadiene resin | | | |
| Conversion of monomer (%) | 45 | 45 | 46.4 |
| Mooney viscosity | 35.9 | 46 | 61.3 |
| Intrinsic viscosity [η] | 2.31 | 2.59 | 3.01 |
| Contents (%) | | | |
| Cis-1,4-structure | 86.7 | — | — |
| 1,2-structure | 11.88 | — | — |
| trans-1,4-structure | 1.4 | — | — |

[Note] In Examples 2 and 3, the contents of the 1,2-cis-1,4- and trans-1,4-structures were not determined.

Examples 4 to 7

In each of Examples 4 to 7, 1,3-butadiene was continuously addition polymerized in accordance with the process shown in the flow sheet of FIG. 2. Cyclohexane was fed in an amount of 34 liters into a solvent tank 1 and mixed with water in the concentration as shown in Table 2. Then, the mixture was further mixed with 90 ml of a toluene solution of triethylaluminum in a concentration of 0.6 milli mole/liter, and fully stirred for enough time. The resultant cyclohexane solution and 1,3-butadiene were continuously introduced in a mass ratio of 70:30 into a mixing vessel 2 through conduits 1a and 2a respectively.

A monomer-solvent mixture was prepared from 1,3-butadiene and the cyclohexane solution (including water, the triethyl aluminum and toluene) in the mixing vessel 2. The concentrations of triethyl aluminum and water in the reaction mixture were respectively shown in Table 2.

A mixed gas of hydrogen with nitrogen was continuously circulated at a flow rate of about 6 l/h, in terms of flow rate under 0.101325 MPa (1 atm) through a conduit 4, the mixing vessel, and a conduit 4c, and the partial pressure of hydrogen in the mixed gas was measured by the gas chromatograph 6 and controlled based on the measured data to a desired value, to cause hydrogen and nitrogen to be dissolved in the monomer-solvent mixture. Also, in the top portion 4b of the mixing vessel 2, vapors generated from the monomer-solvent mixture was mixed into the hydrogen-nitrogen mixed gas. In the mixing vessel 2, a mixing procedure was carried out at the temperature under the pressure as known in Table 2. Also, in the mixing vessel 2, the partial pressure of hydrogen was controlled to the level shown in Table 2.

The hydrogen was dissolved in the monomer-solvent mixture until a vapor-liquid phase equilibrium of hydrogen was attained in response to the partial pressure of hydrogen and the mixing temperature in the mixing vessel 2.

The resultant hydrogen-dissolved monomer-solvent mixture was continuously introduced from the mixing vessel 2 into a first reaction vessel 8 through a conduit 4f, and a toluene solution of cyclopentadienylvanadium trichloride ($CpVCl_3$) in a concentration of 0.005 milli mole/ml and a toluene solution of triphenyl carbonium tetrakis (pentafluorophenyl) borate ($Ph_3CB(C_6F_5)_4$) in a concentration of 0.0025 milli mole/ml were respectively introduced into the first reaction vessel 8 through conduits 7a and 7b and the contents thereof in the reaction mixture in the first reaction vessel 8 were adjusted to the values as shown in Table 2. The addition polymerization of 1,3-butadiene was carried out in the first reaction vessel 8 at a temperature of 40° C. under a pressure of 0.6 MPa as shown in Table 2. The flow rate of the reaction mixture through the first reaction vessel 8 was 4.73 liters/hr.

The reaction mixture passed through the first reaction vessel 8 was introduced into a second reaction vessel 9 through a conduit 8c. Then, the reaction mixture passed through the second reaction vessel 9 at a temperature of 40° C. under a pressure of 0.6 MPa at the same flow rate as that in the first reaction vessel 8. At a first stage of the polymerization, diethylaluminum chloride (DEAC) was fed, as a polymerization stopper, in a content of 2.5 milli moles/liter into the reaction mixture in the second reaction vessel 9, through a conduit 9a.

After the addition polymerization procedure was stopped, the resultant reaction mixture was delivered and collected through a conduit 9b. Then, into the collected reaction mixture, a mixture of ethyl alcohol with heptane in a 50:50 equivalent weight mixing ratio and containing a small amount of 2,6-di-tert-butyl-p-cresol was mixed, the resultant mixture was opened to the ambient atmospheric pressure, and mixed into ethyl alcohol to cause the target polymer to precipitate. The precipitated polymer was collected by filtration and dried.

The collected polymer was subjected to the measurements as mentioned above.

The measurement results are shown in Table 3 and FIGS. 4 to 7.

Figure 4:
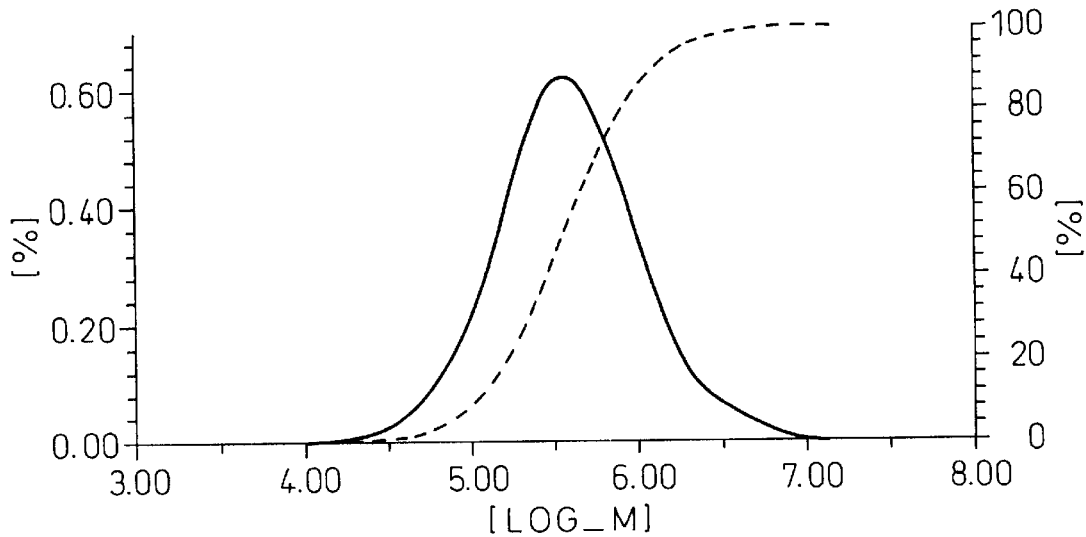
FIG. 4 is a gel permeation chromatographic chart of a polybutadiene resin produced by an embodiment of the method of the present invention.

FIG. 4 is a GPC chart showing the molecular weight distribution of the polybutadiene resin obtained in Example 4. In FIG. 4, there are a clear peak at a log_M=about 5.6 and another indistinct peak at a log_M=about 6.5.

Figure 5:
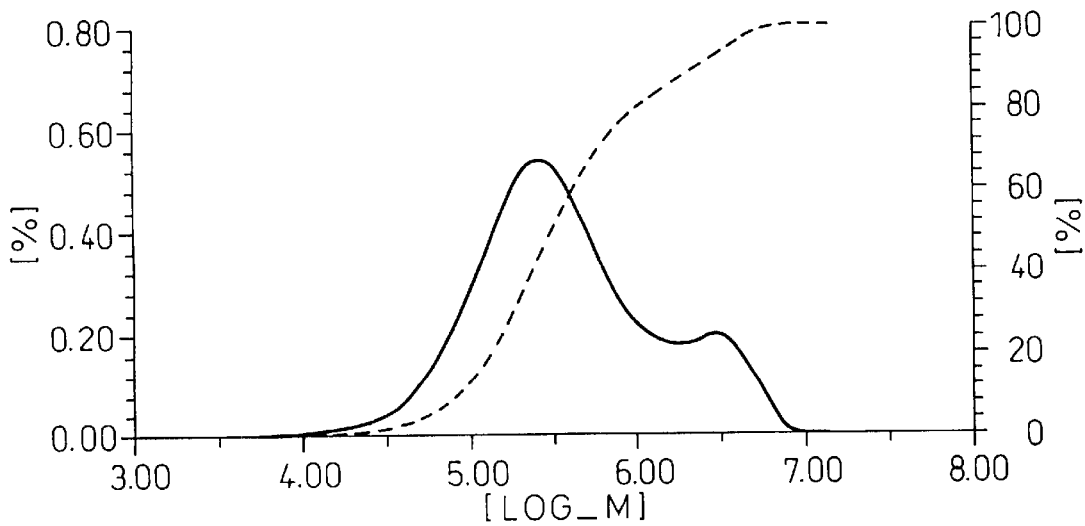
FIG. 5 is a gel permeation chromatographic chart of a polybutadiene resin produced by another embodiment of the method of the present invention.

FIG. 5 is a GPC chart showing the molecular weight distribution of the polybutadiene resin obtained in Example 5.

Figure 6:
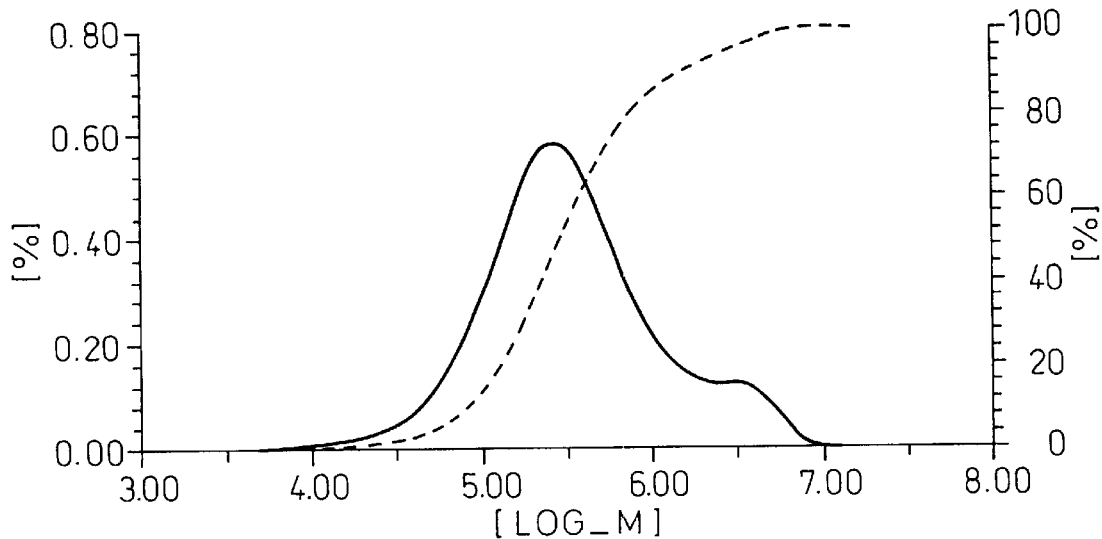
FIG. 6 is a gel permeation chromatographic chart of a polybutadiene resin produced by still another embodiment of the method of the present invention.

FIG. 6 is a GPC chart showing the molecular weight distribution of the polybutadiene resin obtained in Example 6.

Figure 7:
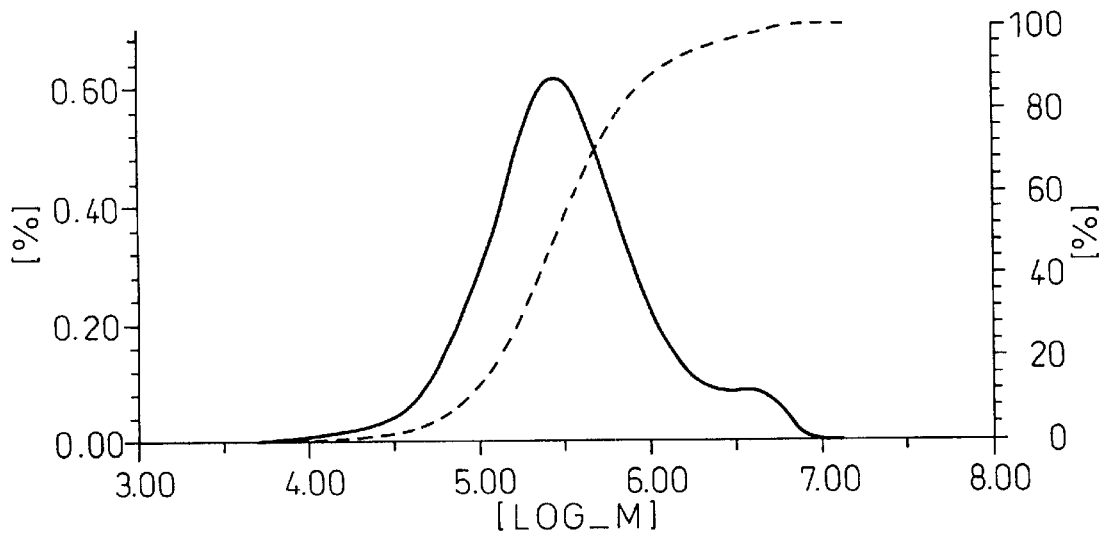
FIG. 7 is a gel permeation chromatographic chart of a polybutadiene resin produced by further another embodiment of the method of the present invention.

FIG. 7 is a GPC chart showing the molecular weight distribution of the polybutadiene resin obtained in Example 7.

In view of Table 3 and FIGS. 4 to 7 showing the molecular weight distribution of the resultant polybutadiene resin of Examples 4 to 7, determined by the gel permeation chromatographic analysis, it was confirmed that the molecular weight distribution curve had two peaks, and the content of the higher molecular weight polybutadiene fraction decreased with increase in the amount of DEAC (polymerization stopper) added to the reaction mixture. Also, it was confirmed that the cold flow of the polybutadiene resin was decreased with increase in the content of the higher molecular weight polybutadiene fraction.

TABLE 2

| | Example No. | | | |
|---|---|---|---|---|
| | 4 | 5 | 6 | 7 |
| Mixing vessel | | | | |
| Content of 1,3-butadiene in monomer-solvent mixture (% by mass) | 30 | 30 | 30 | 30 |
| Content of triethylaluminum in monomer-solvent mixture (m.mol/l) | 1.03 | 1.03 | 1.03 | 1.03 |
| Content of water in monomer-solvent mixture (m.mol/l) | 1.28 | 1.28 | 1.28 | 1.28 |
| Temperature (° C.) | 15 | 20 | 20 | 20 |
| Total pressure (MPa) | 0.3 | 0.3 | 0.3 | 0.3 |
| Partial pressure of hydrogen (MPa) | 0.67 | 0.76 | 0.76 | 0.76 |
| First reaction vessel | | | | |
| Temperature (° C.) | 40 | 40 | 40 | 40 |
| Pressure (MPa) | 0.6 | 0.6 | 0.6 | 0.6 |
| Second reaction vessel | | | | |
| Temperature (° C.) | 40 | 40 | 40 | 40 |
| Pressure (MPa) | 0.6 | 0.6 | 0.6 | 0.6 |
| First and second reaction vessels | | | | |
| Flow rate of reaction mixture (liter/hr) | 4.73 | 4.73 | 4.73 | 4.73 |
| Content of $CpVCl_3$ in reaction mixture (micro mol/liter) | 10 | 10 | 10 | 10 |
| Content of $Ph_3CB(C_6F_5)_4$ in reaction mixture (micro mol/liter) | 15 | 15 | 15 | 15 |
| Content of DEAC in reaction mixture in second reaction vessel (milli mol/liter) | 2.5 | 0.4 | 0.7 | 1.1 |

TABLE 3

| | Example No. | | | |
|---|---|---|---|---|
| Polybutadiene resin | 4 | 5 | 6 | 7 |
| Conversion of monomer (%) | 53.3 | 54 | 51.7 | 49.3 |
| Mooney viscosity | 47.1 | 55.1 | 43.2 | 36.8 |
| Contents (%) | | | | |
| 1,2-structure | 11.6 | 11.7 | 11.8 | 11.8 |
| Cis-1,4-structure | 86.9 | 86.6 | 86.7 | 86.9 |
| trans-1,4-structure | 1.5 | 1.7 | 1.5 | 1.3 |
| Weight average molecular weight | | | | |
| Lower molecular weight fraction (I) | $56 \times 10^4$ | $39 \times 10^4$ | $43 \times 10^4$ | $41 \times 10^4$ |
| Higher molecular weight fraction (II) | $500 \times 10^4$ | $340 \times 10^4$ | $400 \times 10^4$ | $520 \times 10^4$ |
| Content of higher molecular weight fraction (% by mass) | 2.1 | 14.9 | 8.4 | 5.2 |
| Cold flow (g/10 min) | 0.156 | 0.03 | 0.077 | 0.122 |

Examples 8 to 10

In each of Examples 8 to 10, 1,3-butadiene was continuously addition polymerized in accordance with the process shown in the flow sheet of FIG. 3. Cyclohexane was fed in an amount of 34 liters into a solvent tank (not shown in FIG. 3) and mixed with water in the concentration as shown in Table 4. Then, the mixture was further mixed with 90 ml of a toluene solution of triethylaluminum in a concentration of 0.6 milli mole/liter, and fully stirred for an enough time. The resultant cyclohexane solution and 1,3-butadiene were continuously introduced in a mixing mass ratio of 70:30 into a vessel (not shown in FIG. 3).

In the vessel (not shown in FIG. 3), a mixture of 1,3-butadiene and the cyclohexane solution (including water, triethylaluminum and toluene) was prepared. The resultant monomer-solvent mixture was continuously introduced into a mixing vessel 2 through a conduit 11, at a flow rate of 4.73 liters/hr.

A mixed gas of hydrogen with nitrogen was continuously circulated at a flow rate of about 6 l/h, in terms of flow rate under 0.101325 MPa (1 atm) through a conduit 4, the mixing vessel, and a conduit 4c, and the composition of the hydrogen-nitrogen mixed gas was measured by the gas chromatograph 6 and controlled based on the measured data to as desired, to cause hydrogen and nitrogen to be dissolved in the monomer-solvent mixture. Also, in the top portion 4b of the mixing vessel 2, vapors generated from the monomer-solvent mixture were mixed into the hydrogen-nitrogen mixed gas. In the mixing vessel 2, a mixing procedure was carried out at the temperature under the pressure as known in Table 4. Also, in the mixing vessel 2, the partial pressure of hydrogen was controlled to the level shown in Table 4. The hydrogen was dissolved in the monomer-solvent mixture until a vapor-liquid phase equilibrium of hydrogen was attained in response to the partial pressure of hydrogen and the mixing temperature in the mixing vessel 2.

A toluene solution of cyclopentadienylvanadium trichloride ($CpVCl_3$) in a concentration of 0.005 milli mole/ml and a toluene solution of triphenyl carbonium tetrakis (pentafluorophenyl) borate ($Ph_3CB(C_6F_5)_4$) in a concentration of 0.0025 milli mole/ml were respectively and continuously introduced into the mixing vessel 2 through conduits 13 and 14 and the contents thereof in the reaction mixture in the mixing vessel 2 were adjusted to the values shown in Table 4. The addition polymerization of 1,3-butadiene initiated in the mixing vessel 2 at a temperature of 25° C. under a pressure of 0.6 MPa as shown in Table 4. The reaction mixture passed at a flow rate of 4.73 liters/hr through the mixing vessel 2 and introduced into a reactor 7 through a conduit 4f. In the reactor 7, the polymerization was further continued under the conditions shown in Table 4 (temperature: 40° C., pressure: 0.6 MPa).

After the addition polymerization procedure was completed, the resultant reaction mixture was delivered and collected from the reactor 7 through a conduit 7c. Then, into the collected reaction mixture, a mixture of ethyl alcohol with heptane in a 50:50 equivalent weight mixing ratio and containing a small amount of 2,6-di-tert-butyl-p-cresol was mixed, the resultant mixture was opened to the ambient atmospheric pressure, and mixed into ethyl alcohol to cause the target polymer to precipitate. The precipitated polymer was collected by filtration and dried.

The collected polymer was subjected to the measurements as mentioned above. It was confirmed that the Mooney viscosity of the resultant polybutadiene resin decreased with increase in the partial pressure of hydrogen in the mixing vessel, and there is a stable relationship between the partial pressure of hydrogen and the Mooney viscosity of the resultant polybutadiene resin.

The measurement results are shown in Table 4.

TABLE 4

|  | Example No. | | |
| --- | --- | --- | --- |
|  | 8 | 9 | 10 |
| Mixing vessel | | | |
| Content of 1,3-butadiene in monomer-solvent mixture (% by mass) | 30 | 30 | 30 |
| Content of triethylaluminum in monomer-solvent mixture (m.mol/l) | 1.03 | 1.03 | 1.03 |
| Content of water in monomer-solvent mixture (m.mol/l) | 1.28 | 1.28 | 1.28 |
| Partial pressure of hydrogen (MPa) | 0.062 | 0.07 | 0.058 |
| Temperature (° C.) | 25 | 25 | 25 |
| Pressure (MPa) | 0.6 | 0.6 | 0.6 |
| Flow rate of reaction mixture (liter/hr) | 4.73 | 4.73 | 4.73 |
| Content of $CpVCl_3$ in reaction mixture (micro mol/liter) | 10 | 10 | 10 |
| Content of $Ph_3CB(C_6F_5)_4$ in reaction mixture (micro mol/liter) | 15 | 15 | 15 |
| Reactor | | | |
| Temperature | 40 | 40 | 40 |
| Pressure | 0.6 | 0.6 | 0.6 |
| Measurement results | | | |
| Conversion of monomer in mixing vessel (%) | 23 | 23.7 | 23.3 |
| Mooney viscosity of polymer in mixing vessel | 20.5 | 16.2 | 23.1 |
| Viscosity of reaction mixture in mixing vessel (Pa.s) | 1.1 | 0.6 | 1.7 |
| Conversion of monomer in reactor (%) | 53.4 | 52.7 | 54.0 |
| Mooney viscosity of polymer in reactor | 45.1 | 37.5 | 55.2 |
| Contents (%) | | | |
| Contents Cis-1,4-structure | 86.8 | 86.7 | 86.6 |
| trans-1,4-structure | 1.5 | 1.4 | 1.7 |
| 1,2-structure | 11.6 | 11.9 | 11.7 |

As clearly illustrated in Examples 1 to 10, the method of the present invention, in which hydrogen dissolved in a solvent is utilized as a molecular weight modifier for the target polymer, enables the target polymer having a desired molecular weight and a desired distribution of the molecular weight to be continuously produced with a high efficiency and with a high stability.

What is claimed is:

1. A method of producing a polymer from at least one ethylenically unsaturated organic monomer, comprising
   (1) bringing, in a mixing vessel, a hydrogen-containing gas into contact with an inert organic solvent, to prepare a solution of hydrogen in an inert organic solvent, in which solution, a vapor-liquid phase equilibrium between the vapor phase hydrogen in the hydrogen-containing gas and the liquid phase hydrogen in the solution is attained;
   (2) addition-polymerizing, in a reactor consisting of at least one reaction vessel, at least one ethylenically unsaturated organic monomer having at least one ethylenical double bond in the presence of a catalyst in the solution of hydrogen in the inert organic solvent, to thereby produce a polymer of the ethylenically unsaturated organic monomer, while controlling the molecular weight of the polymer in the presence of hydrogen dissolved in the inert organic solvent.

2. The polymer-producing method as claimed in claim 1, wherein the ethylenically unsaturated organic monomer is selected from the group consisting of non-cyclic monoolefins, cyclic monoolefins, conjugated diene monomers, aromatic vinyl compounds, and non-conjugated diolefin compounds.

3. The polymer-producing method as claimed in claim 2, wherein the conjugated diene monomers are selected from the group consisting of 1,3-butadiene, isoprene, 1,3-pentadiene, 2-ethyl-1,3-butadiene, 2,3-dimethylbutadiene, 2-methylpentadiene, 4-methylpentadiene, and 2,4-hexadiene.

4. The polymer-producing method as claimed in claim 2, wherein the non-cyclic monoolefins have 2 to 8 carbon atoms.

5. The polymer-producing method as claimed in claim 2, wherein the cyclic monoolefins have 5 to 8 carbon atoms.

6. The polymer-producing method as claimed in claim 1, wherein the inert organic solvent comprises at least one member selected from aromatic hydrocarbon having 6 to 12 carbon atoms, aliphatic saturated hydrocarbons having 4 to 12 carbon atoms, cycloaliphatic hydrocarbons having 5 to 12 carbon atoms, olefinic hydrocarbons having 2 to 12 carbon atoms, halogenated hydrocarbons, and petroleum solvents.

7. The polymer-producing method as claimed in claim 1, wherein the hydrogen-containing gas fed into the mixing vessel has a partial pressure of hydrogen of 0.0001 to 3 MPa at a temperature of −10 to +90° C., and the content of hydrogen in the inert organic solvent solution is adjusted to 0.1 to 50 ppm by mass.

8. The polymer-producing method as claimed in claim 1, wherein in the addition-polymerization step, hydrogen present in the inert organic solvent solution is in an amount of 0.01 to 500 milli moles, per mole of the ethylenically unsaturated organic monomer.

9. The polymer-producing method as claimed in claim 1, wherein the addition polymerization is carried out at a temperature of −100 to 120° C.

10. The polymer-producing method as claimed in claim 1, wherein the catalyst comprises;
   (A) a metallocene complex of a transition metal compound,
   (B) an ionic compound produced by a reaction of a non-coordination anionic compound with a cationic compound, and
   (C) an organic metal compound of an element of groups I to III of the Periodic Table.

11. The polymer-producing method as claimed in claim 10, wherein the catalyst further comprises (D) water.

12. The polymer-producing method as claimed in claim 1, wherein the addition polymerization reaction of the ethylenically unsaturated organic monomer is carried out in the presence of a chain-transfer agent.

13. The polymer-producing method as claimed in claim 1, wherein the ethylenically unsaturated organic monomer is 1,3-butadiene, the catalyst comprises (a) a metallocene complex of a transition metal compound and (b) at least one member selected from the group consisting of (i) an ionic compound produced by a reaction of a non-coordination anionic compound with a cationic compound, and (ii) an aluminoxane compound; and the resultant polybutadiene resin comprises (I) a lower molecular weight polybutadiene fraction having a weight average molecular weight (Mw) of 305,000 to 700,000, determined by using a gel permeation chromatograph (GPC) and (II) a higher molecular weight polybutadiene fraction having a weight average molecular weight (Mw) of 1,000,000 to 10,000,000, determined by using a gel permeation chromatograph (GPC), each fraction having a molar content of 1,2-structure of 4 to 30%, a molar content of cis-1,4-structure of 65 to 95% and a molar content of trans-1,4-structure of 5% or less.

14. The polymer-producing method as claimed in claim 13, wherein the polybutadiene fraction (II) is in a content of 0.01 to 50% by mass on the basis of the total mass of the polybutadiene resin.

15. The polymer-producing method as claimed in claim 13, wherein the addition polymerization reaction of 1,3-butadiene is carried out in the presence of a chain transfer agent, and the lower molecular weight fraction (I) and the higher molecular weight fraction (II) of the polybutadiene are successively produced by chaining the content of hydrogen, as a chain transfer agent, in the reaction system.

16. The polymer-producing method as claimed in claim 13, wherein the addition polymerization reaction of 1,3-butadiene is continuously carried out in a reactor comprising a first reaction vessel connected in series to a second reaction vessel, and the lower molecular polybutadiene fraction (I) is mainly produced in the first reaction vessel and then the higher molecular polybutadiene fraction (II) is mainly produced in the second reaction vessel.

17. The polymer-producing method as claimed in claim 16, wherein the content of the higher molecular weight polybutadiene fraction (II) in the resultant polybutadiene resin is controlled by adding a polymerization stopper to the reaction system in the second reaction vessel.

18. The polymer-producing method as claimed in claim 1, wherein in the hydrogen-containing gas-contacting step (1) in the mixing vessel, the hydrogen-containing gas is brought into contact with an inert organic solvent having been mixed with at least one ethylenically unsaturated organic monomer and a catalyst, and after the vapor-liquid phase equilibrium is attained between the vapor phase hydrogen in the hydrogen-containing gas and the liquid phase hydrogen in the solution, the resultant liquid mixture is introduced from the mixing vessel into the reactor.

* * * * *